Oct. 2, 1945.   L. N. LINSCOTT   2,385,926
APPARATUS FOR FEEDING AND CUTTING MATERIAL INTO DEFINITE LENGTHS
Original Filed Jan. 15, 1943   6 Sheets-Sheet 3
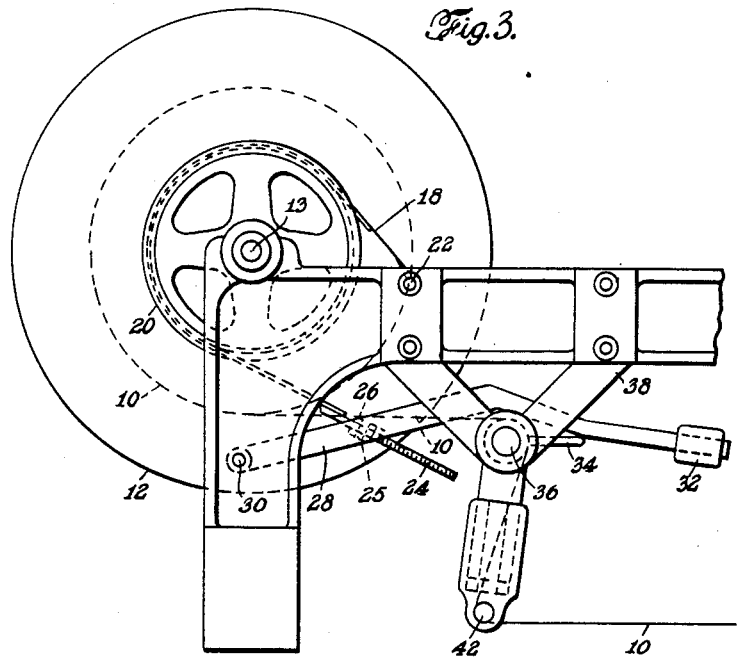
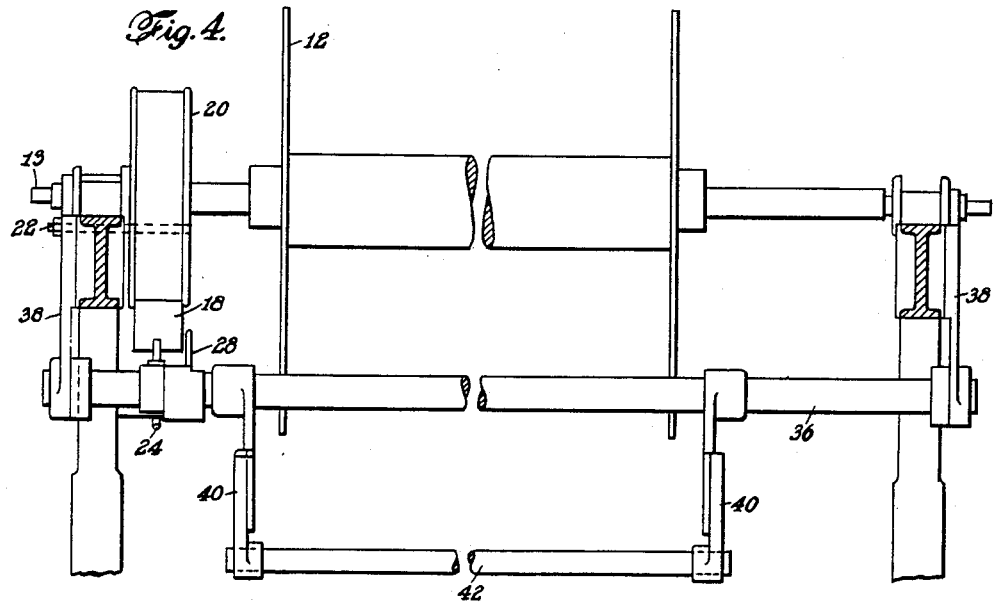
INVENTOR.
LEROY N. LINSCOTT
ATTORNEY.

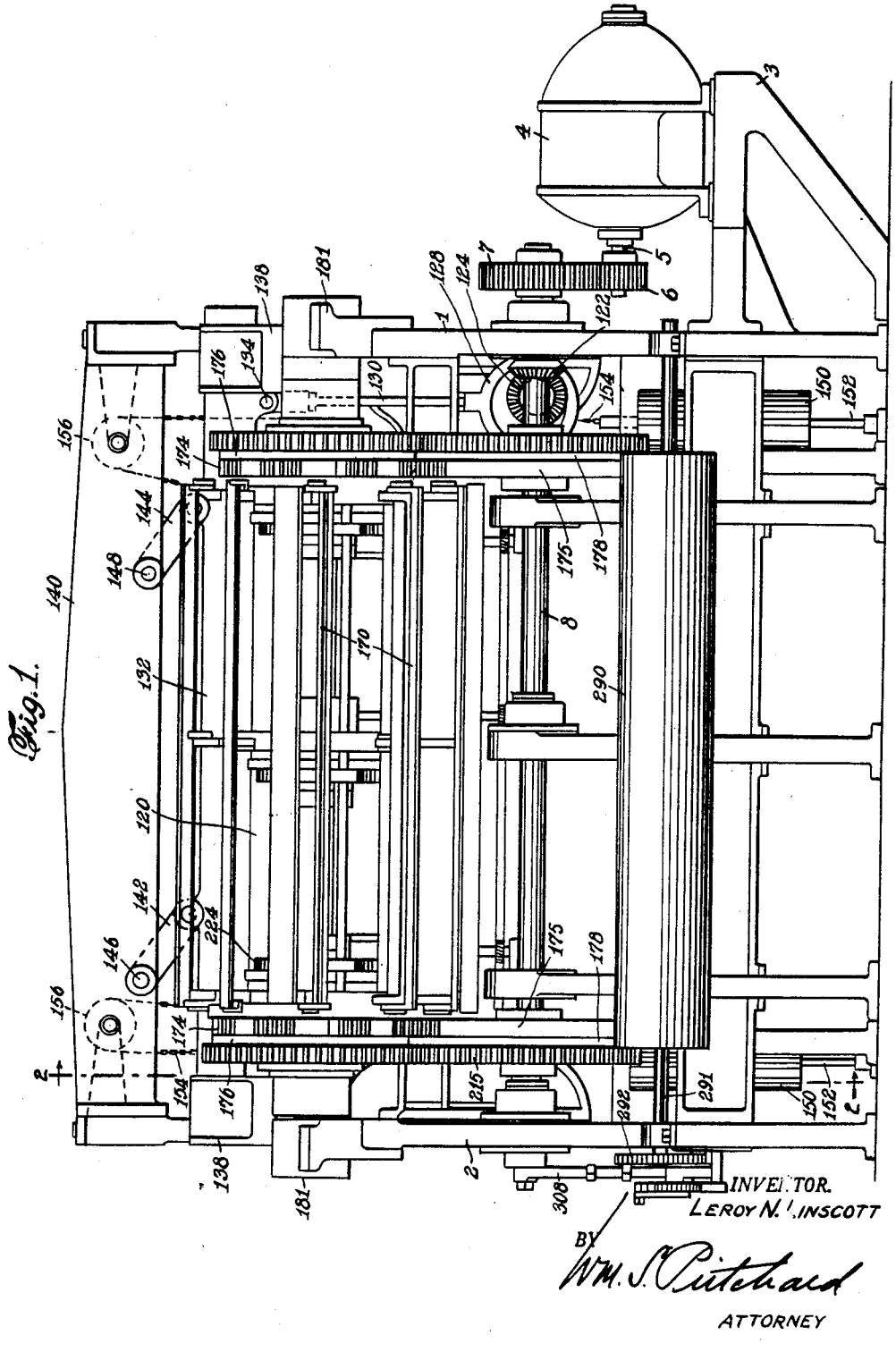

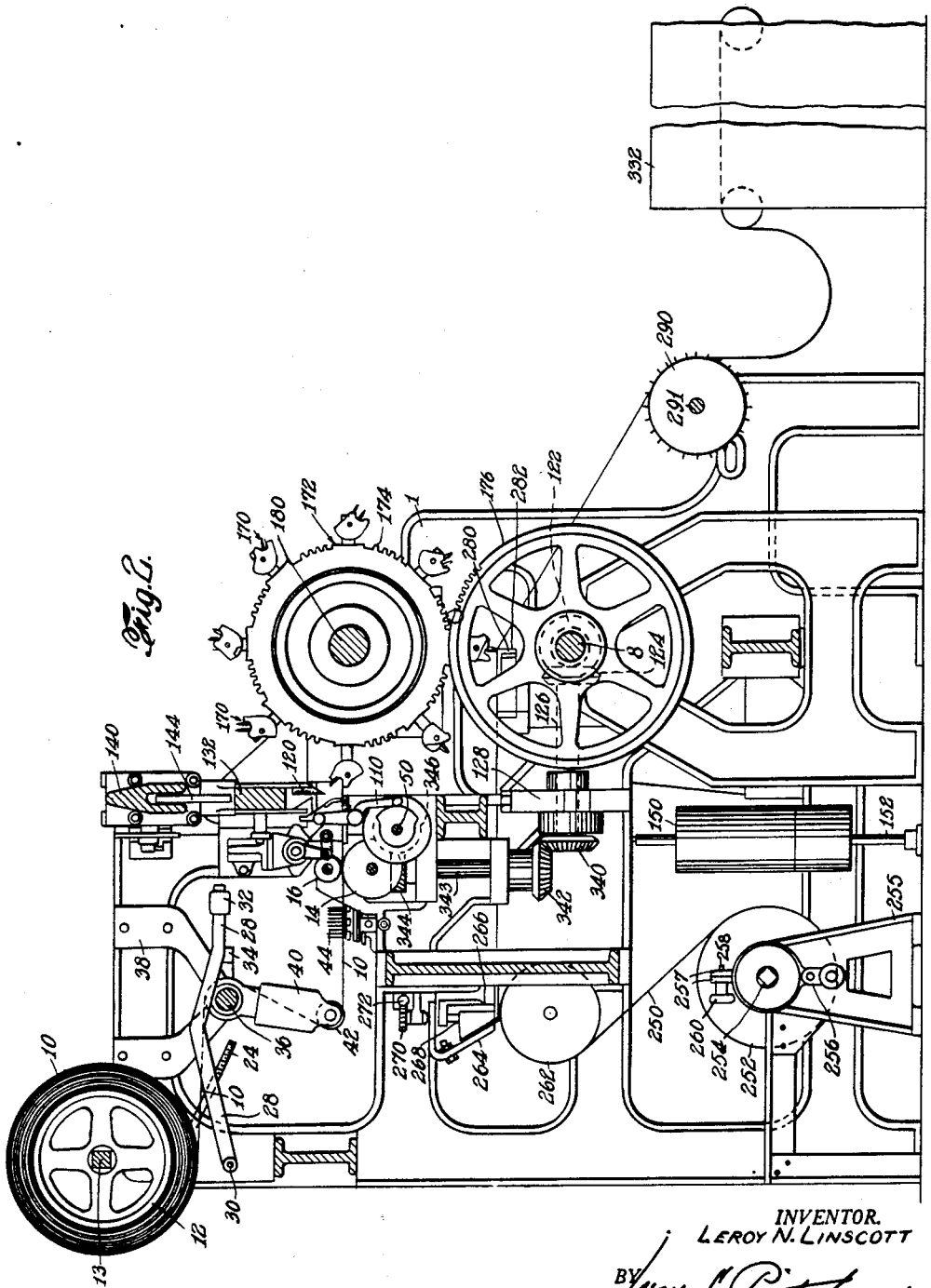

Oct. 2, 1945. L. N. LINSCOTT 2,385,926
APPARATUS FOR FEEDING AND CUTTING MATERIAL INTO DEFINITE LENGTHS
Original Filed Jan. 15, 1943 6 Sheets-Sheet 4
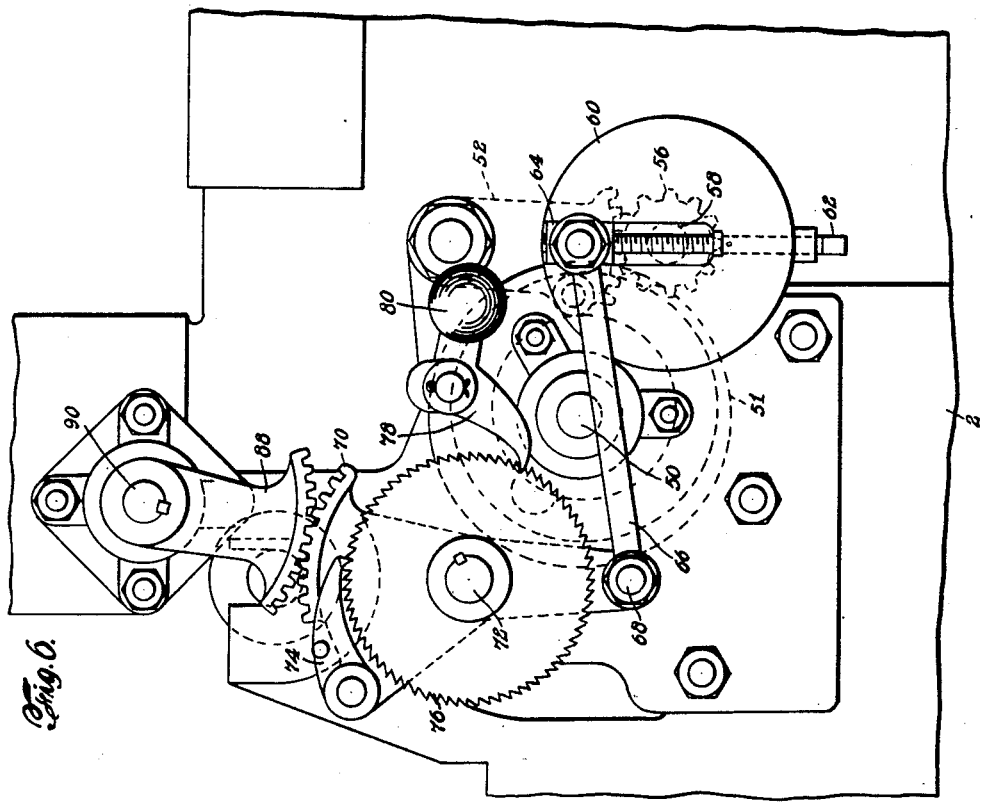
INVENTOR.
LEROY N. LINSCOTT
BY Wm. S. Pritchard
ATTORNEY.

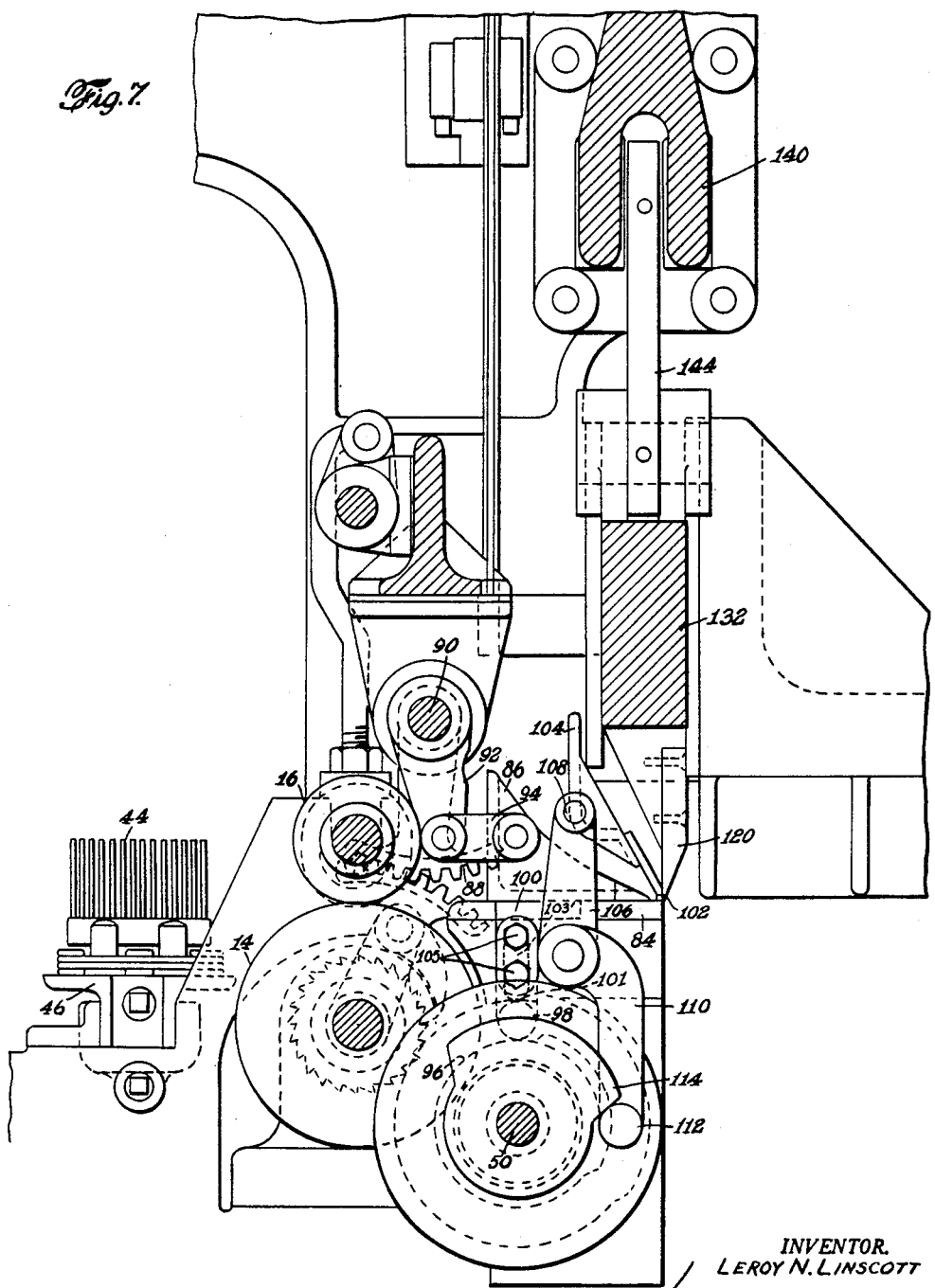

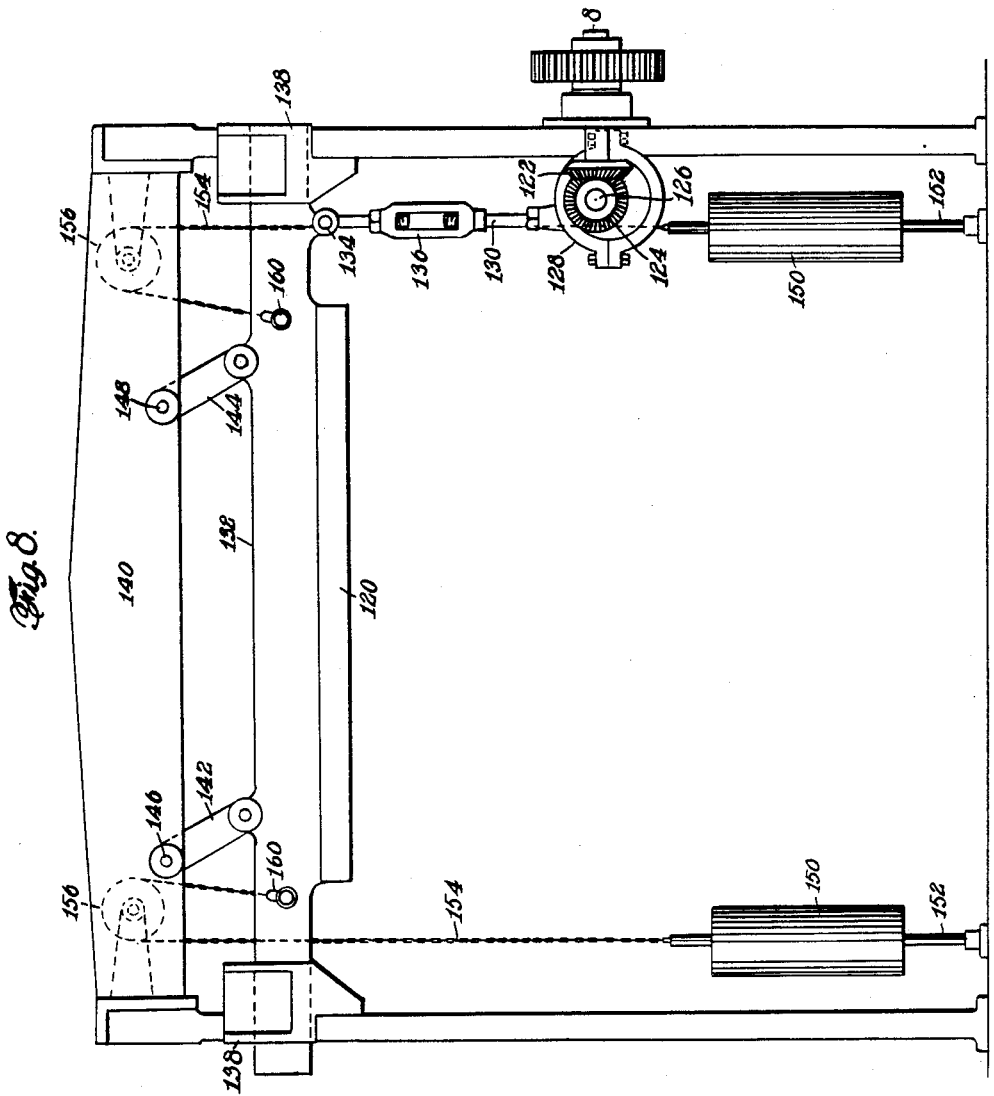

164. CUTTING & PUNCHING
SHEETS & BARS,
53 Patented Oct. 2, 1945

2,385,926

UNITED STATES PATENT OFFICE 2,385,926

APPARATUS FOR FEEDING AND CUTTING MATERIAL INTO DEFINITE LENGTHS

Leroy N. Linscott, Yonkers, N. Y., assignor to Alexander Smith & Sons Carpet Company, Yonkers, N. Y., a corporation of New York Original application January 15, 1943, Serial No. 472,450. Divided and this application November 25, 1943, Serial No. 511,726

19 Claims. (Cl. 164—53)

This invention, which is a division of my application Serial No. 472,450, filed January 15, 1943, relates to an apparatus for feeding, cutting and holding material which is to be cut into definite lengths. More particularly, this invention relates to an apparatus for feeding and cutting a pile-forming material into pile elements of definite lengths.

Though the invention is adapted for use with any material which is to be cut into definite lengths, for convenience it will be described in connection with an apparatus for producing pile fabrics wherein the severed pile-forming elements are embodied in a cementitious coating on a suitable backing to produce a pile fabric in which the pile is in a substantially upright position.

When floor coverings (such as rugs, carpets), upholstery fabrics, etc., are to be produced, the pile is formed of individual yarns of appropriate character as to material and construction. Hereinafter, in this specification and in the claims, for purpose of convenience and brevity, the expression "yarns" is used to cover broadly individual yarns, plied yarns, doubled yarns, strands, rovings or the like of the general character used in carpet and rug manufacture. When pile fabrics, such as fleeces, artificial fur, etc., are to be produced, the pile may be formed from webs of matted or felted fibers of the general character used in the manufacture of fleeces, artificial fur, etc.

The pile may be formed of any pile-forming material or mixtures thereof. Natural fibers such as wool, alpaca, cashmere, hemp, cotton, linen, silk, etc., or artificial fibers such as viscose rayon, acetate rayon, cuprammonium rayon, nylon, casein, spun glass, etc., used singly or in admixture, are illustrative examples of materials which may constitute the pile.

As the backing, various flexible materials may be used. The backing may be a fabric woven from yarns of jute, hemp, linen, cotton, wool, etc., or yarns formed of artificial fibers such as rayon, casein, etc., alone or in conjunction with one another. The backing may also be formed of sheet or film materials, such as leather, synthetic materials such as films formed of cellulose derivatives, resins, etc.

The cementitious coating in which the pile is embedded and by means of which it is to be secured to the backing may comprise adhesive compositions which are applied either in a liquid or plastic condition and which, upon elimination of the liquid vehicle, such as by drying, will set to form a flexible film. Alternatively, the coating may comprise a flexible thermoplastic coating which will become adhesive upon the application of heat. Rubber (natural or synthetic) compositions, resin compositions and cellulose derivative compositions are illustrative examples of adhesive compositions which have given satisfactory results. When rubber (natural or synthetic) compositions are employed, an accelerator may be incorporated therein whereby subsequent to the embedding of the pile therein the composition, upon subjection to heat, will be vulcanized.

In accordance with one general embodiment of this invention, a plurality of yarns, arranged in parallel relationship and forming what might be called a "weftless fabric" of a width to produce a row of pile extending transversely of substantially the entire width of the backing, is intermittently fed by a step-by-step movement to a cutting station, where the leading end of the "fabric" is severed by a knife having a shearing action and which severs the yarns first at one end of the "fabric" and then progressively toward the other end until all the individual yarns have been severed. Prior to the severance of the yarns, the latter are given a further forward movement to provide a substantially uniform length of yarn to be severed. Also, prior to the severance of the yarns, the latter are engaged rearwardly of the portions thereof to be severed by suitable means to securely hold the yarns during the severing operation. When the yarns have been positioned at the severing station, as above generally described, and still prior to the severing action, the leading ends of the yarns are gripped by a gripper. After the severing of the yarns, the gripper, securely holding the severed portions which will constitute the pile, is advanced by a step-by-step movement until the pile elements are in a substantially vertical position with the lower free ends of the pile elements spaced from and substantially at right angles to the point of the cementitious coating on the backing at which the pile is to be deposited and embedded. The gripper is given a (vertically) downward movement whereby the free ends of the pile elements penetrate the cementitious coating and are inserted and embedded therein. After the pile has been embedded in the cementitious coating, the gripper releases the pile, is retracted, and the cycle repeated.

A plurality of grippers are equidistantly positioned along the periphery of a rotor which is rotated intermittently about its axis. Each gripper, comprising a pair of jaws, one of which is movable with respect to the other, is carried on an arm which is slidably mounted and actuated by cam mechanisms at certain periods to effect the desired functions. After a gripper has deposited a row of pile into the coating on the backing, the gripper is in a retracted position and the jaws thereof in open position. In this condition, such gripper is intermittently advanced by the intermittent rotation of the rotor until said gripper is in position to grip the leading ends of the yarn at the pile-severing station. At this time, during a period of dwell of the rotor, the arm on which the gripper is mounted is given a forward movement to enable the gripper to grasp the yarn and the movable jaw is actuated to bring the jaws into closed position, gripping the ends of the yarn. After severing of the yarn, the gripper is advanced, by an intermittent motion, to the pile-depositing station where, during a period of dwell of the rotor, the arm carrying the gripper is given a further forward movement (in this case, the movement would be vertically downward), whereby the free ends of the pile are embedded in the coating. Thereafter, the movable jaw is actuated to open the jaws and release the pile, the arm carrying the gripper being retracted, and the cycle repeated. The cycle is the same for each gripper.

The apparatus which constitutes this invention includes many novel elements and combinations of mechanisms and is characterized by extreme precision and capacity for adjustment to secure any desired density of pile and any desired height of pile.

In order to more fully explain the instant invention, reference will now be had to the drawings illustrating an illustrative embodiment of the invention and wherein:

Figure 1 is a front elevation of an apparatus embodying the feeding and cutting mechanism constituting the invention;

Figure 2 is a section taken on the line 2—2 of Figure 1;

Figure 3 is a side elevation of the yarn supply and appurtenant elements;

Figure 4 is a front elevation, partly in section, of the yarn supply and appurtenant elements shown in Figure 3;

Figure 5 is a front elevation of the yarn-feeding means;

Figure 6 is a side view of the yarn-feeding mechanism;

Figure 7 is a side elevation of the mechanism for imparting the additional forward movement to the yarns, the holding mechanism, and the cutting mechanism; and Figure 8 is a front elevation of the cutting mechanism and the actuating means therefor.

Referring now to the drawings wherein like reference numerals and like characters designate similar parts, the reference numerals 1 and 2 designate a pair of members suitably secured by various cross-pieces to constitute the frame and on which the various elements of the machine are mounted, as will hereafter be more fully set forth. A bracket 3, secured to the frame member 1, carries a motor 4. The motor shaft 5, through a train of gears 6 and 7, actuates a shaft 8. The shaft 8 is the main driveshaft of the machine and, as will appear, all mechanisms are actuated therefrom.

A plurality of yarns 10 constituting the pile-forming elements is unwound from an unwinding reel 12 fastened to a shaft 13, appropriately mounted in the frame, by a feed roll 14, which is intermittently actuated, as more fully explained hereafter, and with which an adjustable and retractable roller 16 cooperates. The feed roll 14, as well as the presser roll 16, may be provided with surfaces or coverings to increase the tractive effect thereof. The yarn, in its course of travel from the unwinding reel 12 to the rolls 14 and 16, is maintained under tension for reasons which will become apparent.

The tension means, as shown in Figures 3 and 4, comprises a brake band 18 which cooperates with a brake drum 20 carried on the shaft 13. One end of the brake band is secured at 22 on a yoke 38. The other end of the brake band 18 is adjustably secured to a brake lever 28. Though the brake band 18 may be adjustably secured to the lever 28 in various manners in the form shown (Figures 3 and 4), the band 18 is provided with a threaded extension, such as a screw 24, which passes through a lug 25 and secured in position by the nut 26. By proper adjustment of the screw 24 in the lug 25, the desired tension may be applied to the brake drum 20 through the brake band 18.

The brake lever 28 at one end thereof is pivotally mounted on the frame at 30. The other end of the lever 28 is free and carries an adjustable weight 32. As shown in Figure 3, the lever 28 is curved and is supported on a finger 34 which is carried on a tension shaft 36 mounted in a pair of yokes 38 secured to the opposite frame members. A pair of arms 40, suspended from the tension shaft 36, carry a tension roll 42.

As the yarns 10 are fed from the bottom of the beam 12 over the tension shaft 36 and beneath a tension roll 42, the tension roll 42 is moved forward. The movement is transmitted to the finger 34 which, acting through the brake lever 28, releases the brake 18 and permits the yarns to be unwound from the beam 12.

The yarns 10 are then passed through a reed 44 positioned intermediate the tension roll 42 and the feed roll 14, whereby the yarns may be properly aligned. The reed 44 is of the usual type and is adjustably mounted on a support 46 (see Figure 7).

As previously mentioned, the feed roll 14 is intermittently rotated to intermittently feed the yarns from the unwinding reel 12, and the manner in which this is secured will now be described.

Referring now to Figures 5 and 6, a cam shaft 50, driven from the main drive shaft 8 as hereafter described, has secured thereto a feed cam 51 which drives a gear sector 52 through a cam follower. Due to the contour of the feed cam 51, the gear sector 52 transmits a rocking motion to a feed sector spur gear 56 secured adjacent one end of a short shaft 58 running through the left side end frame. On the other end of the shaft 58, there is fastened a crank plate 60, adjustable by means of a screw 62. A stud nut 64 secures one end of a feed rod 66 to the screw 62. The other end of the feed rod 66 is connected at 68 to one end of a gear sector 70 which is loosely mounted on a shaft 72. A feed pawl 74, also carried by the gear sector 70, transmits the motion of the gear sector 70 to a toothed wheel 76 secured to the shaft 72 on which the feed roll 14 is secured. A second pawl 78, by means of a weighted arm 80, cooperates with the toothed wheel 76 to prevent retrograde movement thereof. The degree of rotary movement of the feed roll 14 depends on the degree of movement imparted to the toothed wheel 76 by the pawl 74. By varying the throw of the feed lever 66 by appropriate adjustment of the stud nut 64 on the screw 62, the amount of rotation of the feed roll 14, and hence the feed of the yarns 10, can be regulated.

After the yarns leave the feed roll 14, they travel on a highly polished plate 84 which, in fact, serves as a bottom knife. While the yarns 10 are on the plate 84, they are engaged and controlled by a pusher 86 that has a forward and backward as well as an up-and-down movement.

The forward and backward movements are obtained, as shown in Figure 7, through a gear sector 88 driven by the gear sector 70. The gear sector 88 is fastened to a shaft 90 which passes throughout the width of the machine. At each end of the shaft 90, there is provided a lever 92. One end of a lever 94 is secured to the lever 92 and the other end of the lever 94 is secured to one side of the yarn pusher 86. Since the forward and backward movements of the pusher 86 are secured through the gear sector 70, any adjustment of the feed of the yarn by the crank plate 60 also changes the travel of the yarn pusher 86.

The up-and-down motion of the yarn pusher 86 is provided by a cam 96 on the cam shaft 50 and which transmits its motion to a follower 98 secured to the lower end of a slide 100 on which the pusher 86 rests. The slide 100 is provided with a slot 101 in which there is positioned a follower guide 103. The follower guide 103 is stationary and secured by bolts 105 to a stationary part of the machine.

The actuating mechanisms of the yarn pusher 86 are so adjusted and timed that the yarn pusher 86 will be in its lower position when the yarns are to be advanced; and in its upper position, not engaging the yarns, when the pusher has imparted the necessary movement to the yarns and it is desired to begin another advancing movement. In other words, the pusher 86 has a 4-motion feed. In its lower position, it engages the yarns to advance the same. At the limit of the advancement, the yarn pusher 86 is elevated and, while in the elevated position, is moved rearwardly until it is in its original position, at whch time it is lowered to engage the yarns on the plate 84.

After the pusher 86 has advanced the yarns engaged thereby so that they are in position to be severed, the yarns are securely held in this position by a yarn-holding plate 102 so that they will not be disturbed during the time that the cutting operation is being effected. As shown in Figure 7, the yarn holder 102, which is of a length to engage all of the yarns fed to cutting position, is carried by a holder 104 which is secured to a rocking lever 106 through a stud 108. Rocking movement is imparted to the rocking lever 106 by an arm 110 which carries a cam follower 112 riding on a cam 114 on the cam shaft 50. By appropriate contour of the cam 114, the movement of the yarn holder 102 is so timed that it is lifted away from the yarns during the feed thereof and is in holding position just prior to and during the cutting operation.

When the yarns are in position to be cut and the yarn-holding plate 102 has been brought into engagement therewith, the projecting portions of the yarns to be severed are gripped by a gripper mechanism, generally designated by the reference numeral 170. The yarns, in the condition just described, are severed by means of a knife 120, which, as shown in Figure 8, is actuated through the main shaft 8 through a gear 122, carried on said shaft 8 and driving a gear 124 fastened on a knife shaft 126. An eccentric 128, which is secured to the shaft 126, is secured by means of a rod 130 to a knife holder 132 by a stud 134. The knife 120 is secured to the holder 132 in any suitable manner. It will be noted that the rod 130 is provided with a turnbuckle 136 whereby the rod 130 may be adjusted to compensate for any wear or sharpening of the knife 120.

The knife holder is guided at each end by a large bearing surface 138 carried on each side of the frame. A pair of spaced links 142 and 144, having one end thereof secured to the knife holder and the other ends secured to studs 146 and 148 respectively on a girt 140, secure the knife holder 132 to the girt 140 carried by the frame of the machine. The knife 120 is provided with a shearing action, and this is secured by making the link 142 slightly longer, such as 1/16 of an inch, than the link 144. It is to be noted that the links 142 and 144 swivel on studs 146 and 148 respectively. Thus, it will be seen that through this arrangement, when the knife 120 is brought downward by the eccentric 128, the left side of the knife (see Figure 8) will cut the yarn on the left-hand side of the machine first. During the cutting operation, the yarns are cut by sliding as well as a side motion of the knife in the guides 138.

The weight of the knife 120 is compensated for by the use of a pair of counterbalanced weights 150, one at each side of the machine. Each of the weights 150 is slidably mounted on a rod 152, the lower extremity of the rod being securely fixed to the floor or platform on which the machine is placed. Each of the counterbalancing weights 150 is connected to one end of a chain 154, the other end of which is fastened to the knife holder 132 through a link 160. It is to be noted that each chain 154 passes over a sprocket 156 above the top of the knife holder 132 and journalled in a bracket carried by the frame.

The grippers, which grip the leading ends of the yarns prior to the severing thereof, convey the severed pile elements to the pile-depositing station and embed the pile elements into the cementitious coating, are generally designated by the reference numeral 170. A plurality of such grippers 170 are equidistantly positioned around the periphery of a rotor, which is generally designated by the reference numeral 172. At each end, the rotor is provided (as shown in Figure 1) with an interrupted gear 174 which is driven by an interrupted gear 175 secured to the main shaft 8. Since, in the form shown, the rotor 172 is provided with eight grippers, the interrupted gearing 174 and 175 are each provided with a corresponding number (eight) of stops or dwells. It is to be understood that any number of grippers and corresponding number of dwells in the interrupted gears 174 and 175 may be used. The rotor 172 is provided with a brake shoe 176 which is locked into position intermittently by a disc 178 on the main shaft 8 during the periods of dwell.

The rotor 172 is intermittently rotated through the interrupted gearing 174 and 175 about a stationary shaft 180, the ends of which extend beyond the ends of the rotor and are secured at each end thereof in bearings 181 secured to the respective frame members.

The precise construction and mode of operation of the grippers 170 and the parts appurtenant thereto are fully described on pages 14–18 of my application Serial No. 472,450 and, since they form no part of the instant invention, further description is deemed unnecessary.

The fabric 250 which is to constitute the backing is delivered, as shown in Figure 2, from a roll 252 on the shaft 254 carried on a frame 255. The delivery of the fabric is controlled by a brake 256. The brake 256 is provided with a pair of ears 257 which cooperate with a screw 258 provided at one end of a hand grip 260. Upon rotation of the hand grip 260 in the desired direction, the tension on the brake 256 may be increased or decreased as desired. The fabric passes over a supporting roll 262 where the selected adhesive is applied from a hopper 264. The hopper is provided with a doctor blade 266 which governs the amount of adhesive applied to the backing. The doctor 266 is slidably positioned so that it can be adjusted to substantially uniformly apply and control the thickness of the adhesive.

The cementitious coated fabric is fed onto a table 280 positioned beneath the rotor 172. As shown in Figure 2, the coated fabric travels in a substantially horizontal plane from the adhesive-applying mechanism to and over the table 280. At the forward end of the table 280, the coated backing abruptly changes its direction by travelling downward at the edge 282. The bend in the coated fabric is substantially directly below the gripper in position to deposit the pile fabric, and the embedding of the fibers is effected substantially at the bend or beginning of the abrupt change in direction of travel of the adhesively coated fabric. The abrupt change in the direction of movement of the fabric permits the withdrawal of the previously inserted row of pile from out of the path of downward travel of the gripper depositing the next successive row of pile. It also permits close disposition of the rows of pile relative to each other.

In normal operation, the table 280 is disposed so that the free ends of the pile held by the gripper in the pile-depositing position will be in spaced relationship with respect to the adhesive coating on the backing and substantially at right angles thereto at the place of deposit.

The fabric 250 is unwound from the roll 252 by means of an intermittently driven take-up roll 290. The details of construction of the means for adjusting and driving the take-up roll 290 are fully described in my said application Serial No. 472,450.

The feed take-up roll 290 is in the nature of a card roll whereby it will positively engage the under side of the backing and advance it.

Upon leaving the roll 290, the pile fabric is passed into a chamber 332 wherein it is subjected to heat in order to firmly set the adhesive composition. In the event that the adhesive composition comprises a rubber adhesive, the rubber will be vulcanized during this operation. In the event that the adhesive composition sets upon the elimination of solvents, then the solvent will be eliminated in this operation. After leaving the heating chamber 332, the now finished pile fabric is wound up into a roll or cut into appropriate sizes, as desired.

As hereinbefore stated, the cam shaft 50 is driven from the main shaft 8. As shown in Figure 2, the shaft 8 is operatively connected, through the gears 122 and 124, to drive the shaft 126. The shaft 126 carries a mitre gear 340 which meshes with a mitre gear 342 at one end of a vertical shaft 343. The other end of the vertical shaft 343 is provided with a spiral gear 344 meshing with a spiral gear 346 which is mounted on the cam shaft 50.

As is apparent from the foregoing, all of the driving mechanisms are driven directly or through suitable connections from the main drive shaft. The various cams and actuating mechanisms are timed to effect the results at the required periods.

Since it is obvious that various changes and modifications may be made in the above description without departing from the nature or spirit thereof, this invention is not restricted thereto except as set forth in the appended claims.

I claim:

1. An apparatus for feeding and and cutting pile-forming material into pile elements of definite lengths which comprises means to intermittently feed a pile-forming material, a table to which said pile material is fed, a pusher engaging said pile material on said table and advancing said pile material thereover into position for severing, a gripper to grip the leading edge portion of the pile material prior to severance thereof, and a knife to sever said plie material extending beyond said table and while held by said gripper.

2. An apparatus for feeding and cutting pile-forming material into pile elements of definite lengths which comprises means to intermittently feed a pile-forming material, a table to which said pile material is fed, a pusher, means to successively move said pusher forward, upward, rearward and downward to its original position, said pusher in its original position engaging said pile material on said table and in its forward movement advancing said pile material thereover into position for severing, a gripper to grip the leading edge portion of the pile material prior to severance thereof, and a knife to sever said pile material extending beyond said table and while held by said gripper.

3. An apparatus for feeding and cutting pile-forming material into pile elements of definite lengths which comprises means to intermittently feed a pile-forming material into position for severing, a gripper to grip the leading edge portion of the pile material prior to severance thereof, a knife to sever said pile material while held by said gripper, means to reciprocate said knife in a vertical plane, and means to cause said knife to sever said pile material progressively from one side edge to the other on its downward stroke.

4. An apparatus for feeding and cutting pile-forming material into pile elements of definite lengths which comprises means to intermittently feed a pile-forming material into position for severing, a gripper to grip the leading edge portion of the pile material prior to severance thereof, a knife to sever said pile material while held by said gripper, and means to reciprocate said knife in a vertical plane, said knife having its cutting edge inclined transversely thereof from one end to the other whereby said knife will progressively sever the pile by a shearing action on its downward stroke.

5. An apparatus for feeding and cutting pile-forming material into pile elements of definite lengths which comprises means to intermittently feed a pile-forming material into position for severing, a gripper to grip the leading edge portion of the pile material prior to severance thereof, a knife to sever said pile material while held by said gripper, means to reciprocate said knife in a vertical plane, and means to mount said knife so that the cutting edge thereof is inclined transversely thereof from one end to the other whereby said knife will progressively sever the pile by a shearing action on its downward stroke.

6. An apparatus for feeding and cutting pile-forming material into pile elements of definite lengths which comprises means to intermittently feed a pile-forming material into position for severing, a gripper to grip the leading edge portion of the pile material prior to severance thereof, a knife to sever said pile material while held by said gripper, a holder carrying said knife, a support, and a pair of links suspending said knife holder from said support, one of said links being longer than the other whereby said knife edge is inclined.

7. An apparatus for feeding and cutting pile-forming material into pile elements of definite lengths which comprises means to intermittently feed a pile-forming material into position for severing, a gripper to grip the leading edge portion of the pile material prior to severance thereof, a knife having its cutting edge inclined to sever said pile material while held by said gripper, a knife holder carrying said knife, means suspending said knife holder from a support, and means to counterbalance said knife and knife holder.

8. An apparatus for feeding and cutting pile-forming material into pile elements of definite lengths which comprises a table, the forward edge of which constitutes a bottom knife, means to intermittently feed a pile-forming material to said table, a pusher adapted to engage said pile material on said table at predetermined times and intermittently advance said pile material thereover into position for severing, a gripper to grip the leading edge portion of the pile material prior to severance thereof, a knife adapted to cooperate with the forward edge of said table to sever said pile material extending byond said table and while held by said gripper, and means to actuate said knife at predetermined times to effect the severing operation.

9. An apparatus for feeding and cutting pile-forming material into pile elements of definite lengths which comprises a table, the forward edge of which constitutes a bottom knife, means to intermittently feed a pile-forming material to said table, a pusher adapted to engage said pile material on said table at predetermined times and intermittently advance said pile material thereover into position for severing, timed means to actuate said pusher, a gripper to grip the leading edge portion of the pile material prior to severance thereof, a knife adapted to cooperate with the forward edge of said table to sever said pile material extending beyond said table and while held by said gripper, and means to actuate said knife at predetermined times to effect the severing operation.

10. An apparatus for feeding and cutting pile-forming material into pile elements of definite lengths which comprises a table, the forward edge of which constitutes a bottom knife, means to intermittently feed a pile-forming material to said table, a pusher engaging said pile material on said table at predetermined times and intermittently advancing said pile material thereover into position for severing, means to hold said pile material in said position on said table during the severing operation, a gripper to grip the leading edge portion of the pile material prior to severance thereof, a knife adapted to cooperate with the forward edge of said table to sever said pile material extending beyond said table and while held by said gripper, and means to actuate said knife at predetermined times to effect the severing operation.

11. An apparatus for feeding and cutting pile-forming material into pile elements of definite lengths which comprises a table, the forward edge of which constitutes a bottom knife, means to intermittently feed a pile-forming material to said table, a pusher engaging said pile material on said table at predetermined times and intermittently advancing said pile material thereover into position for severing, a plate, timed means to actuate said plate to engage and hold said pile material in position on said table during the severing operation and release said pile material after the severing operation, a gripper to grip the leading edge portion of the pile material prior to severance thereof, a knife adapted to cooperate with the forward edge of said table to sever said pile material extending beyond said table and while held by said gripper, and means to actuate said knife at predetermined times to effect the severing operation.

12. An apparatus for feeding and cutting pile-forming material into pile elements of definite lengths which comprises a table, the forward edge of which constitutes a bottom knife, means to intermittently feed a pile-forming material to said table, a pusher adapted to engage said pile material on said table at predetermined times and intermittently advance said pile material thereover into position for severing, a gripper to grip the leading edge portion of the pile material prior to severance thereof, a knife adapted to cooperate with the forward edge of said table to sever said pile material extending beyond said table and while held by said gripper, and means to actuate said knife at predetermined times to effect the severing operation, said knife having its cutting edge positioned to effect a progressive shearing action transversely of the pile material.

13. An apparatus for feeding and cutting pile-forming material into pile elements of definite lengths which comprises a table, the forward edge of which constitutes a bottom knife, means to intermittently feed a pile-forming material to said table, a pusher adapted to engage said pile material on said table at predetermined times and intermittently advance said pile material thereover into position for severing, timed means to actuate said pusher, a gripper to grip the leading edge portion of the pile material prior to severance thereof, a knife adapted to cooperate with the forward edge of said table to sever said pile material extending beyond said table and while held by said gripper, and means to actuate said knife at predetermined times to effect the severing operation, said knife having its cutting edge positioned to effect a progressive shearing action transversely of the pile material.

14. An apparatus for feeding and cutting pile-forming material into pile elements of definite lengths which comprises a table, the forward edge of which constitutes a bottom knife, means to intermittently feed a pile-forming material to said table, a pusher engaging said pile material on said table at predetermined times and intermittently advancing said pile material thereover into position for severing, means to hold said pile material in said position on said table during the severing operation, a gripper to grip the leading edge portion of the pile material prior to severance thereof, a knife adapted to cooperate with the forward edge of said table to sever said pile material extending beyond said table and while held by said gripper, and means to actuate said knife at predetermined times to effect the severing operation, said knife having its cutting edge positioned to effect a progressive shearing action transversely of the pile material.

15. An apparatus for feeding and cutting pile-forming material into pile elements of definite lengths which comprises a table, the forward edge of which constitutes a bottom knife, means to intermittently feed a pile-forming material to said table, a pusher engaging said pile material on said table at predetermined times and intermittently advancing said pile material thereover into position for severing, a plate, timed means to actuate said plate to engage and hold said pile material in position on said table during the severing operation and release said pile material after the severing operation, a gripper to grip the leading edge portion of the pile material prior to severance thereof, a knife adapted to cooperate with the forward edge of said table to sever said pile material extending beyond said table and while held by said gripper, and means to actuate said knife at predetermined times to effect the severing operation, said knife having its cutting edge positioned to effect a progressive shearing action transversely of the pile material.

16. An apparatus for feeding and cutting pile-forming material into pile elements of definite lengths which comprises a table, the forward edge of which constitutes a bottom knife, means to intermittently feed a pile-forming material to said table, a pusher adapted to engage said pile material on said table at predetermined times and intermittently advance said pile material thereover into position for severing, a gripper to grip the leading edge portion of the pile material prior to severance thereof, a knife adapted to cooperate with the forward edge of said table to sever said pile material extending beyond said table and while held by said gripper, means to mount said knife at an inclination to the horizontal, and means to actuate said knife at predetermined times to effect the severing operation.

17. An apparatus for feeding and cutting pile-forming material into pile elements of definite lengths which comprises a table, the forward edge of which constitutes a bottom knife, means to intermittently feed a pile-forming material to said table, a pusher adapted to engage said pile material on said table at predetermined times and intermittently advance said pile material thereover into position for severing, timed means to actuate said pusher, a gripper to grip the leading edge portion of the pile material prior to severance thereof, a knife adapted to cooperate with the forward edge of said table to sever said pile material extending beyond said table and while held by said gripper, means to mount said knife at an inclination to the horizontal, and means to actuate said knife at predetermined times to effect the severing operation.

18. An apparatus for feeding and cutting pile-forming material into pile elements of definite lengths which comprises a table, the forward edge of which constitutes a bottom knife, means to intermittently feed a pile-forming material to said table, a pusher engaging said pile material on said table at predetermined times and intermittently advancing said pile material thereover into position for severing, means to hold said pile material in said position on said table during the severing operation, a gripper to grip the leading edge portion of the pile material prior to severance thereof, a knife adapted to cooperate with the forward edge of said table to sever said pile material extending beyond said table and while held by said gripper, means to mount said knife at an inclination to the horizontal, and means to actuate said knife at predetermined times to effect the severing operation.

19. An apparatus for feeding and cutting pile-forming material into pile elements of definite lengths which comprises a table, the forward edge of which constitutes a bottom knife, means to intermittently feed a pile-forming material to said table, a pusher engaging said pile material on said table at predetermined times and intermittently advancing said pile material thereover into position for severing, a plate, timed means to actuate said plate to engage and hold said pile material in position on said table during the severing operation and release said pile material after the severing operation, a gripper to grip the leading edge portion of the pile material prior to severance thereof, a knife adapted to cooperate with the forward edge of said table to sever said pile material extending beyond said table and while held by said gripper, means to mount said knife at an inclination to the horizontal, and means to actuate said knife at predetermined times to effect the severing operation.

LEROY N. LINSCOTT.

CERTIFICATE OF CORRECTION.

Patent No. 2,385,926.                                    October 2, 1945.

LEROY N. LINSCOTT.

It is hereby certified that error appears in the printed specification of the above numbered patent requiring correction as follows: Page 2, second column, lines 60 and 61, for "60, adjustable by means of a screw 62. A stud nut 64" read --60. A stud nut 64, adjustable by means of a screw 62,--; page 4, second column, line 18, claim 1, strike out "and" second occurrence; page 5, first column, line 46, claim 8, for "byond" read --beyond--; and that the said Letters Patent should be read with this correction therein that the same may conform to the record of the case in the Patent Office.

Signed and sealed this 1st day of January, A. D. 1946.

Leslie Frazer (Seal)

First Assistant Commissioner of Patents.